(12) United States Patent
Kim et al.

(10) Patent No.: US 9,999,952 B2
(45) Date of Patent: Jun. 19, 2018

(54) STRUCTURE FOR REDUCING THERMAL DISPLACEMENT OF MACHINE TOOL STRUCTURE

(75) Inventors: Won Nyun Kim, Seoul (KR); Tae Weon Gim, Gyeongsangnam-do (KR); Yoon Jong Lee, Gyeonggi-do (KR); Sang Kyoo Lee, Gyeonggi-do (KR)

(73) Assignee: Doosan Machine Tools Co., Ltd., Gyeongsangnam-do (KR)

(*) Notice: Subject to any disclaimer, the term of this patent is extended or adjusted under 35 U.S.C. 154(b) by 421 days.

(21) Appl. No.: 14/232,715

(22) PCT Filed: Jul. 16, 2012

(86) PCT No.: PCT/KR2012/005642
§ 371 (c)(1),
(2), (4) Date: Jan. 14, 2014

(87) PCT Pub. No.: WO2013/012224
PCT Pub. Date: Jan. 24, 2013

(65) Prior Publication Data
US 2014/0144168 A1 May 29, 2014

(30) Foreign Application Priority Data

Jul. 15, 2011 (KR) .......................... 10-2011-0070607

(51) Int. Cl.
*F24H 3/00* (2006.01)
*B23Q 11/12* (2006.01)
*B23Q 11/14* (2006.01)

(52) U.S. Cl.
CPC .......... *B23Q 11/126* (2013.01); *B23Q 11/141* (2013.01); *Y10T 409/303976* (2015.01)

(58) Field of Classification Search
CPC ......... B23Q 11/12; B23Q 11/10; B23Q 11/14; B23Q 11/0003; B23Q 11/0007;
(Continued)

(56) References Cited

U.S. PATENT DOCUMENTS 4,083,272 A * 4/1978 Miller ...................... B23Q 1/28
33/638
5,582,237 A * 12/1996 Miyano ............... B23Q 11/141
165/259
(Continued)

FOREIGN PATENT DOCUMENTS

JP          5966534 U      5/1984
JP          2011-073108    4/2011
(Continued)

OTHER PUBLICATIONS

Search Report dated Jan. 25, 2013 and written in Korean with English translation for International Patent Application No. PCT/KR2012/005642, 5 pages.

*Primary Examiner* — Grant Moubry
*Assistant Examiner* — Jose O Class-Quinones
(74) *Attorney, Agent, or Firm* — John D. Veldhuis-Kroeze; Westman, Champlin & Koehler, P.A.

(57) ABSTRACT

The present disclosure relates to a structure for reducing thermal displacement of a machine tool structure, and more particularly, to a structure for reducing thermal displacement of a machine tool structure capable of reducing thermal displacement of a structure in order to prevent processing precision from deteriorating due to deformation of a fixed structure by heat generated at a part where the fixed structure and a movable structure perform frictional motion together with each other. Accordingly, in order to resolve a technical problem, an object of the present invention is to provide a structure for reducing thermal displacement of a machine tool structure capable of preventing a structure from being deformed and distorted by reducing a temperature deviation over the entire structure by rapidly transferring heat to other parts when a temperature of a specific part of the structure is raised.

4 Claims, 18 Drawing Sheets

(58) Field of Classification Search
CPC .... B23Q 15/18; B23Q 11/126; B23Q 11/128;
B23Q 11/141; B23B 2250/125; B23B
2250/12; B23B 2270/24; B23B 27/10;
B23B 2231/24
USPC .......... 82/149, 900; 165/47, 81, 82; 384/15,
384/43–45, 55, 317, 321, 476, 900;
62/238.1, 259.1, 259.2
See application file for complete search history.

(56) References Cited

U.S. PATENT DOCUMENTS

| | | | |
|---|---|---|---|
| 5,743,326 A | | 4/1998 | Slocum |
| 6,039,517 A | * | 3/2000 | Charewicz ............. B23Q 3/154 269/8 |
| 2001/0042424 A1 | * | 11/2001 | Sheehan ................ B23Q 1/015 82/121 |
| 2002/0053268 A1 | * | 5/2002 | Ueda ........................ B23B 3/06 82/129 |
| 2008/0193064 A1 | * | 8/2008 | Roders ................... B23Q 1/017 384/45 |
| 2008/0206004 A1 | * | 8/2008 | Giannetti ............... B23Q 11/10 408/56 |
| 2008/0289393 A1 | * | 11/2008 | Lee ...................... B21D 22/025 72/342.2 |

FOREIGN PATENT DOCUMENTS

| | | |
|---|---|---|
| KR | 1019950003042 B1 | 3/1995 |
| KR | 1020040100135 A | 12/2004 |
| KR | 1020070118666 A | 12/2007 |
| KR | 1020130009468 | 1/2013 |

* cited by examiner

Fig. 13
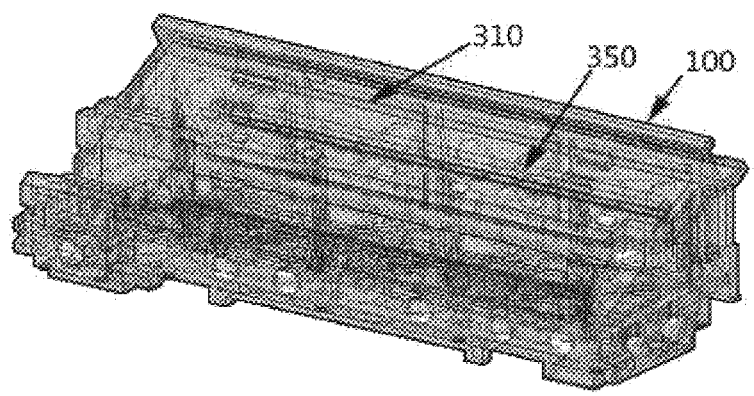
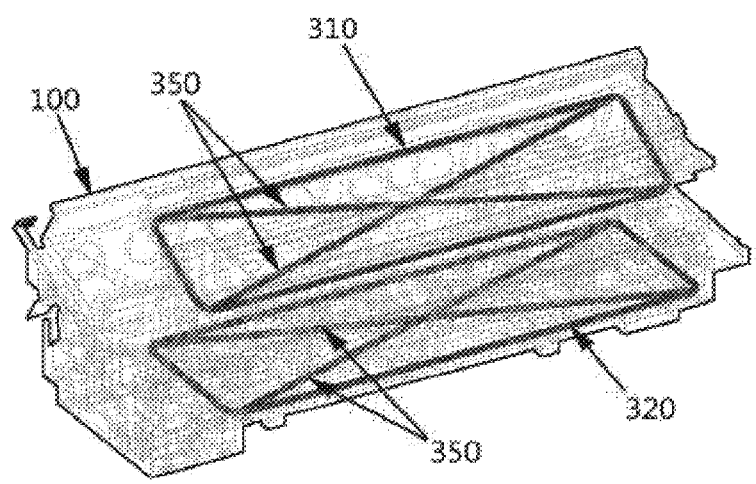

STRUCTURE FOR REDUCING THERMAL DISPLACEMENT OF MACHINE TOOL STRUCTURE

CROSS-REFERENCE TO RELATED APPLICATION

This application is a Section 371 National Stage application of International Application No. PCT/KR2012/005642, filed Jul. 16, 2012 and published, not in English, as WO2013/012224 on Jan. 24, 2013.

FIELD OF THE DISCLOSURE

The present disclosure relates to a structure for reducing thermal displacement of a machine tool structure, and more particularly, to a structure for reducing thermal displacement of a machine tool structure capable of reducing thermal displacement of a structure in order to prevent processing precision from deteriorating due to deformation of a fixed structure by heat generated at a part where the fixed structure and a movable structure perform frictional motion together with each other.

BACKGROUND OF THE DISCLOSURE

In general, a machine tool is configured by a combination of various constituent elements such a bed frame, a column frame, a cross frame, a table unit, a turret unit, a transfer table unit, a spindle, a sub-spindle, a tailstock, and the like.

Meanwhile, a structure of the machine tool may be separated into a fixed structure and a movable structure, the movable structure is installed on the fixed structure, and the movable structure moves while performing relative motion with respect to the fixed structure.

The fixed structure may be the bed frame of the machine tool, and the movable structure may be the transfer table unit or the column frame of the machine tool.

In addition, because another movable structure may be moved by being installed on the movable structure, a particular movable structure may be understood as a fixed structure, and for example, the turret unit may be installed on the transfer table unit, and in this case, the transfer table unit may be understood as the fixed structure, and the turret unit may be understood as the movable structure.

As described above, heat due to friction is generated at the part where the fixed structure and the movable structure come in close contact with each other when the fixed structure and the movable structure move together with each other, and the heat causes thermal deformation of the fixed structure or the movable structure.

In addition, because a relative position of the movable structure with respect to the fixed structure is varied when processing of a work piece proceeds, a position at which heat is generated may be varied.

Particularly, temperature differences of the structure occur between parts to which heat is applied and parts to which heat is not applied, and because amounts of displacement of expanded parts are different from each other due to the temperature differences, distortion of the structure occur.

This thermal deformation causes problems in that processing precision of the work piece deteriorates, and further, processing quality of the work piece is lowered.

As technologies contrived in order to cope with the problems due to thermal displacement, the following Patent Literatures 1, 2, and 3 have been disclosed.

Patent Literature 1 relates to a cooling apparatus for a machine tool structure capable of reducing an error due to heat generated in a transfer system of the machine tool, which suppress heat, which is generated inevitably, by forming a cooling flow path in a ball screw shaft of the transfer system for transferring tools as well as a cooling flow path formed to prevent thermal deformation of a ball screw shaft of a spindle system.

Meanwhile, in Patent Literature 1, the respective cooling flow paths are connected to an inlet and an outlet of a provided cooler so as to be able to be circulated, and a temperature controller is included in the cooler so as to compare a temperature of discharged oil with a temperature of the atmosphere, and cool oil flowing into the inlet.

However, in the technology disclosed in Patent Literature 1, because a large number of peripheral devices such as an oil tank, a condenser, an evaporator, an expansion valve, various pipes, and the like are required in order to cool and circulate oil, a configuration of the cooling apparatus is complicated, and a number of precautions are required to perform maintenance management thereof.

Patent Literature 2 relates to a cooling apparatus for a machine tool that cools heat generated at a spindle head by forming an oil space between an outer wall and an inner wall of the spindle head, and supplying and circulating cooling oil from an oil tank to an oil space formed in the spindle head through a cooling medium line.

However, in the technology disclosed in Patent Literature 2, there are problems in that because a large number of peripheral devices are required similarly to Patent Literature 1 in order to circulate cooling oil, a number of precautions are required to perform maintenance management thereof, and because a cooling operation is limited to the spindle head, heat generated at other structures such as a bed frame of the machine tool may not be cooled.

In Patent Literature 3, a temperature sensor is provided at a part where heat generation is estimated, an amount of thermal displacement is detected based on information obtained from the temperature sensor, and an amount of relative movement with respect to the respective shafts is corrected by converting the displacement amount.

However, in the technology disclosed in Patent Literature 3, the amounts of movements of the respective shafts are corrected with numbers by calculating information provided by a plurality of temperature sensors using a S/W, but it is difficult to accurately estimate a direction in which a structure is distorted or deformed because environment (temperature, humidity, or the like) where the machine tool is installed and operated is varied, and processing forms for work pieces are various, there may be a case in which a result value, which is theoretically obtained, and a correcting value, which needs to be actually applied, are different from each other, and in this case, there is a problem in that it is difficult to perform precise processing.

CITATION LIST

Patent Literature (Patent Literature 1) Korean Patent Application Laid-Open No. 10-2004-0100135 (Dec. 2, 2004)
(Patent Literature 2) Korean Patent No. 10-1995-003042 (Mar. 30, 1995)
(Patent Literature 3) Korean Patent Application Laid-Open No. 10-2007-0118666 (Dec. 17, 2007)

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

Accordingly, in order to resolve a technical problem, an embodiment of the present disclosure is to provide a structure for reducing thermal displacement of a machine tool structure capable of preventing a structure from being deformed and distorted by reducing a temperature deviation over the entire structure by rapidly transferring heat to other parts when a temperature of a specific part of the structure is raised.

Technical problems of the present disclosure are not limited to the technical problems described above, and technical problems that are not described will be clearly understood by a person skilled in the art from the description below.

In order to achieve the technical problem, a structure for reducing thermal displacement of a machine tool structure according to the present disclosure includes: a fixed structure 100 which is provided in the machine tool and has one side on which a guide rail 102 is formed; a movable structure 120 which is installed on the guide rail 102, and moves; and a cooling unit 300 which allows cooling oil to be circulated in the fixed structure 100 so as to cool the fixed structure 100, and allows temperature distribution of the fixed structure 100 to be uniform, in which the cooling unit 300 includes: a first cooling unit which is disposed in the fixed structure 100 to be adjacent to the guide rail 102, and performs a heat exchange between heat generated at the guide rail 102 and the cooling oil; a second cooling unit which is disposed below the first cooling unit to be spaced apart from the first cooling unit on the basis of the overall configuration of the fixed structure 100, and performs a heat exchange; and a pump unit 400 which is disposed at one side of the cooling unit 300, and forcibly circulates the cooling oil along the first and second cooling units.

In addition, the first cooling unit may be first and third cooling flow paths 301 and 303 which are disposed to be parallel to each other on the basis of the guide rail 102, the second cooling unit may be fifth and seventh cooling flow paths 305 and 307 which are disposed below the first and third cooling flow paths 301 and 303 to be spaced apart from the first and third cooling flow paths 301 and 303, fourth and eighth cooling flow paths 304 and 308 may be further included which connect the first and third cooling flow paths 301 and 303 and the fifth and seventh cooling flow paths 305 and 307, respectively, and the first and third cooling flow paths 301 and 303 and the fifth and seventh cooling flow paths 305 and 307 may be disposed in an internal space of the fixed structure 100 in the form of a '⊏'.

In addition, the structure may further include a second cooling flow path 302 which connects the first cooling flow path 301 and the third cooling flow path 303; and a sixth cooling flow path 306 which connects the fifth cooling flow path 305 and the seventh cooling flow path 307, in which the first, second, third, fourth, fifth, sixth, seventh, and eighth cooling flow paths 301, 302, 303, 304, 305, 306, 307, and 308 are disposed in the fixed structure 100 in the form of a loop so as to allow the cooling oil to be circulated.

In addition, the cooling unit 300 may include: a first loop cooling unit 310 which is disposed in the fixed structure 100 to be adjacent to the guide rail 102, and performs a heat exchange by circulating the cooling oil in the form of a loop; and a second loop cooling unit 320 which is disposed below the guide rail 102 to be spaced apart from the guide rail 102 on the basis of the overall configuration of the fixed structure 100, and performs a heat exchange by circulating the cooling oil in the form of a loop.

In addition, the structure may further include a third loop cooling unit 330 which is disposed between the first loop cooling unit 310 and the second loop cooling unit 320 on the basis of the overall configuration of the fixed structure 100, and performs a heat exchange by circulating the cooling oil in the form of a loop.

In addition, the structure may further include a connecting cooling flow path 340 which is disposed to connect the first loop cooling unit 310 and the second loop cooling unit 320 to each other, and circulates the cooling oil.

In addition, the structure may further include auxiliary cooling flow paths 350 which are disposed at the first loop cooling unit 310 and the second loop cooling unit 320, respectively, and increase an area for a heat exchange by circulating the cooling oil across the first loop cooling unit 310 and the second loop cooling unit 320.

In addition, in order to achieve the technical problem, a structure for reducing thermal displacement of a machine tool structure according to the present disclosure includes: a fixed structure 200 which is provided in the machine tool, and has one side on which a guide rail 202 is formed; a movable structure 210 which is installed on the guide rail 202 of the fixed structure 200, and moves; and a cooling unit 300 which is disposed at the fixed structure 200 to be adjacent to the guide rail 202 on the basis of the overall configuration of the fixed structure 200, and allows temperature distribution of the fixed structure 200 to be uniform by performing a heat exchange between heat generated at the guide rail 202 and the cooling oil so as to cool the fixed structure 200.

In addition, a cooling flow path of the cooling unit 300 may be disposed to pass through the guide rail 202.

Details of other exemplary embodiments are included in the detailed description and the drawings.

In the structure for reducing thermal displacement of a machine tool structure according to the present disclosure, which is configured as described above, even though high-temperature heat is generated at an unspecified part, the heat is rapidly transferred to other parts by the cooling oil in the cooling flow path, so that the overall temperature deviation of the structure may become uniform, thereby reducing problems that the structure of the machine tool is deformed due to thermal displacement.

In addition, the system for reducing thermal displacement of a machine tool structure according to the present disclosure may use the cooling oil semipermanently after filling the cooling oil into the cooling flow path such that there is a merit in that it is convenient because separate maintenance is not required.

In addition, the system for reducing thermal displacement of a machine tool structure according to the present disclosure requires the cooling flow path through which the cooling oil is circulated, and constituent elements of the pump which forcibly circulates the cooling oil, a manufacturing process is easy, and manufacturing costs may be low in comparison with technologies known in the related art.

DESCRIPTION OF THE DRAWINGS

FIGS. 8 to 14 are views for explaining a structure for reducing thermal displacement of a machine tool structure according to third to ninth exemplary embodiments of the present disclosure.

DESCRIPTION OF MAIN REFERENCE NUMERALS OF DRAWINGS

Figure 1:
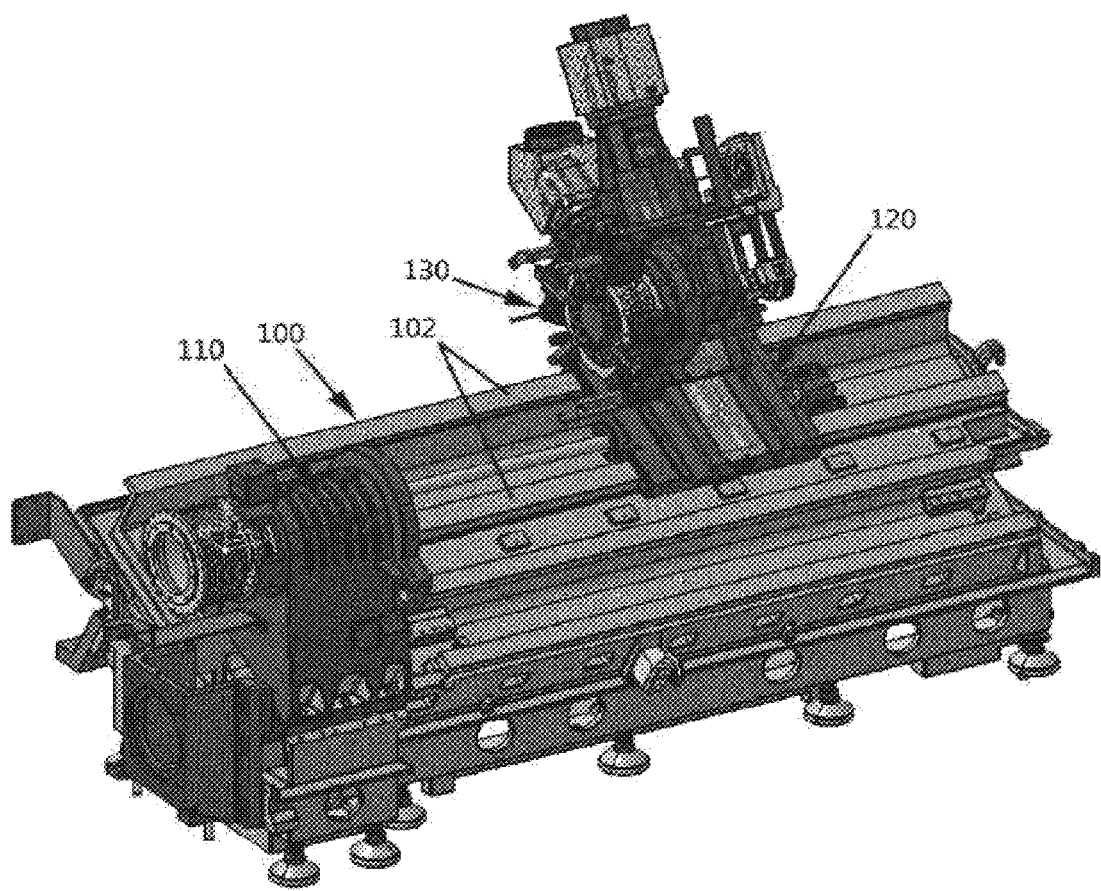
FIG. 1 is an illustrative view for explaining a structure of a machine tool.

100, 200: Fixed structure
110, 120, 130, 210: Movable structure
102, 202: Guide rail
204: First Part
206: Second part
300: Cooling unit
301 to 309: First to eighth cooling flow paths
310, 320, 330: First to third loop cooling units
340: Connecting cooling flow path
350: Auxiliary cooling flow path
400: Pump unit

DETAILED DESCRIPTION

The advantages and characteristics of the present disclosure and methods for achieving the same will become clear from the exemplary embodiments set forth in detail below with reference to the accompanying drawings.

Like reference numerals represent like elements throughout the specification.

First, a structure of a machine tool will be described with reference to FIG. 1.

The structure may be defined as a fixed structure 100 and movable structures 110, 120, and 130, a guide rail 102 is formed on the fixed structure 100, and the movable structure 120 is installed on the guide rail 102.

In the description of the present disclosure, a bed frame will be described as an example of the fixed structure 100, and a transfer table will be described as an example of the movable structure 120.

Meanwhile, another movable structure may be installed on the movable structure 120 as a similar structure, and for example, a turret unit 130 may be installed on a transfer table (see 120).

In addition, a yet another movable structure may be installed on the fixed structure 100, and for example, a constituent element such as a spindle 110, a tailstock, a vibration absorber, or the like may be installed.

That is, a stationary structure may be understood as the fixed structure 100, and a moving structure may be understood as the movable structure 120, on the basis of motion forms of the fixed structure 100 and the movable structure 120.

First Comparative Example

Thermal displacement of the fixed structure 100 of a first comparative example will be described with reference to the accompanying FIGS. 2 and 3.

Figure 2:
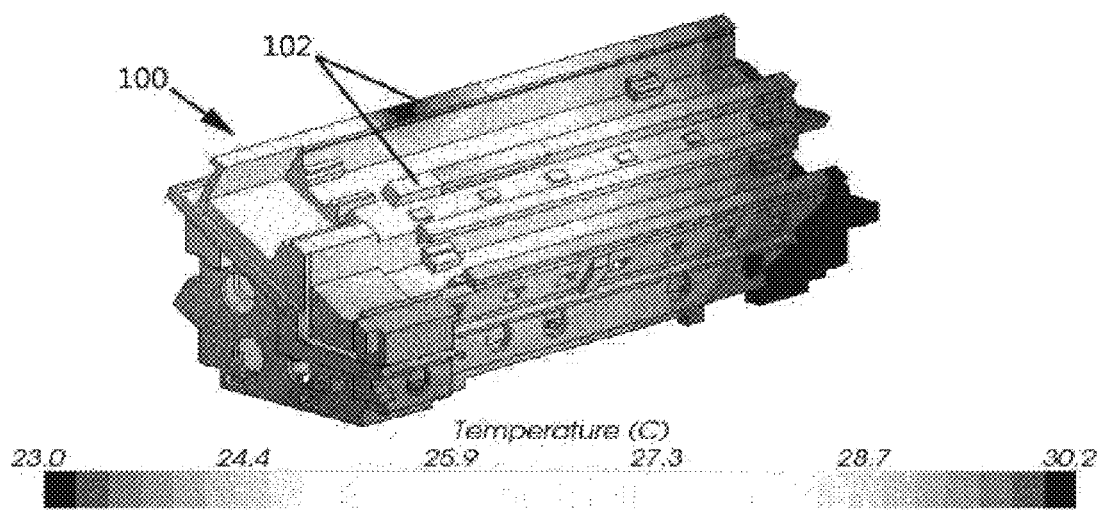
FIG. 2 is an illustrative view illustrating an example in which a temperature is raised at a specific part of a structure that is a first comparative example of a machine tool.
Figure 3:
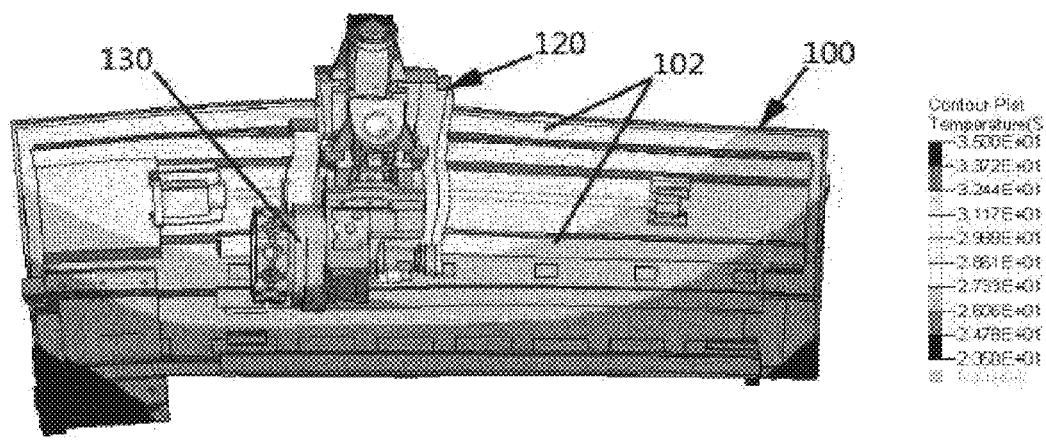
FIG. 3 is an illustrative view for explaining thermal displacement when a temperature is raised at a specific part of the structure that is the first comparative example of the machine tool.

The accompanying FIG. 2 is a view illustrating temperature distribution after performing a simulation using a thermal flow analysis software, and the accompanying FIG. 3 is a view illustrating thermal deformation.

The movable structure 120 may be moved by a transfer system unit, and here, because friction occurs between the fixed structure 100 and the movable structure 120, a temperature of a part at which friction occurs is raised relatively to temperatures of other parts.

The part at which friction occurs may be a part of the guide rail 102 that guides the movement of the movable structure 120, and supports a load of the movable structure 120.

Referring to FIG. 2, it can be seen that a temperature is raised concentratedly to a part of the guide rail 102 in the fixed structure 100.

Referring to FIG. 3, it can be seen that heat is generated at the movable structure 120, and a phenomenon occurs in which the fixed structure 100 that is the bed frame is distorted by the heat.

Heat may be generated concentratedly when a spindle is driven, or the transfer system unit is driven, and the generated heat is transferred to a structure such as the bed frame, the transfer table, and the like.

Therefore, the structure is deformed by variations in temperature, but because temperature distribution of the structure is not uniform when the structure is expanded, it is not possible to expect in which direction and form the structure is deformed, and therefore it is difficult to estimate in which direction and to what extent a correction is performed.

Therefore, the exemplary embodiment according to the present disclosure is to reduce thermal displacement of the structure by allowing temperature distribution to be uniform over the entire structure by rapidly transferring heat generated at a specific part of the structure to other parts.

Hereinafter, a structure for reducing thermal displacement of a machine tool structure according to first and second exemplary embodiments of the present disclosure will be described with reference to FIGS. 4 to 7.

Figure 4:
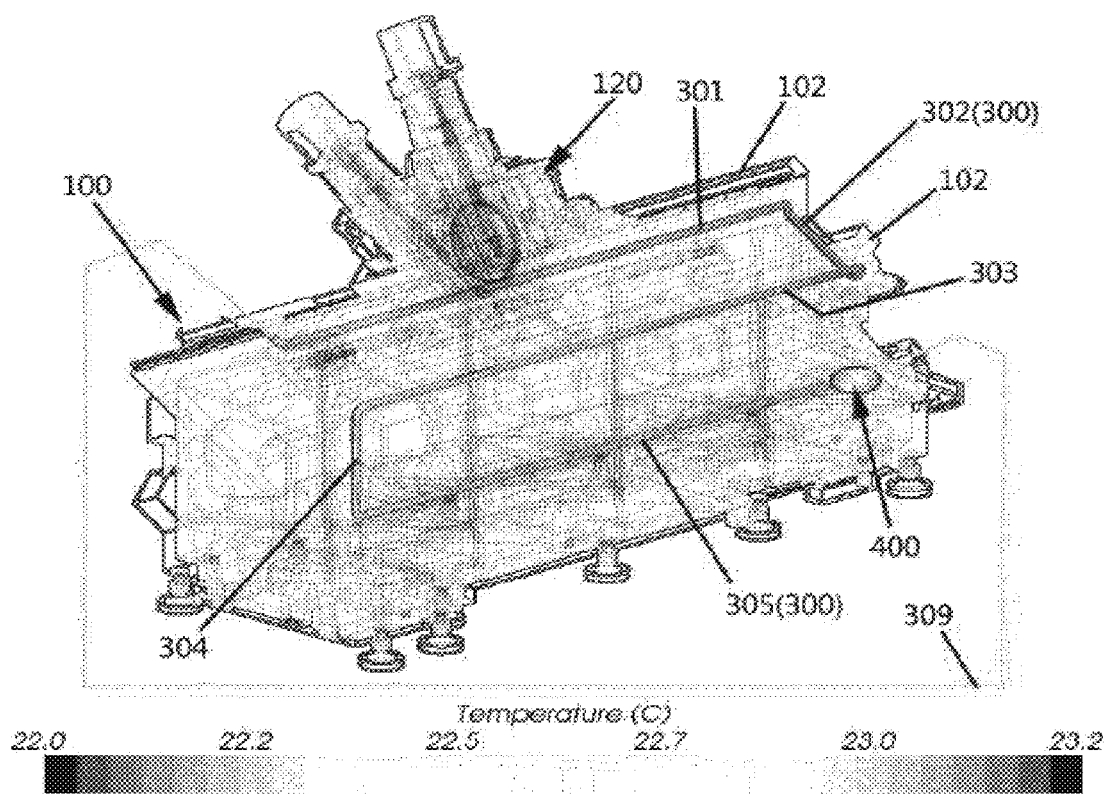
FIGS. 4 and 5 are views for explaining a structure for reducing thermal displacement of a machine tool structure according to first and second exemplary embodiments of the present disclosure.
Figure 5:
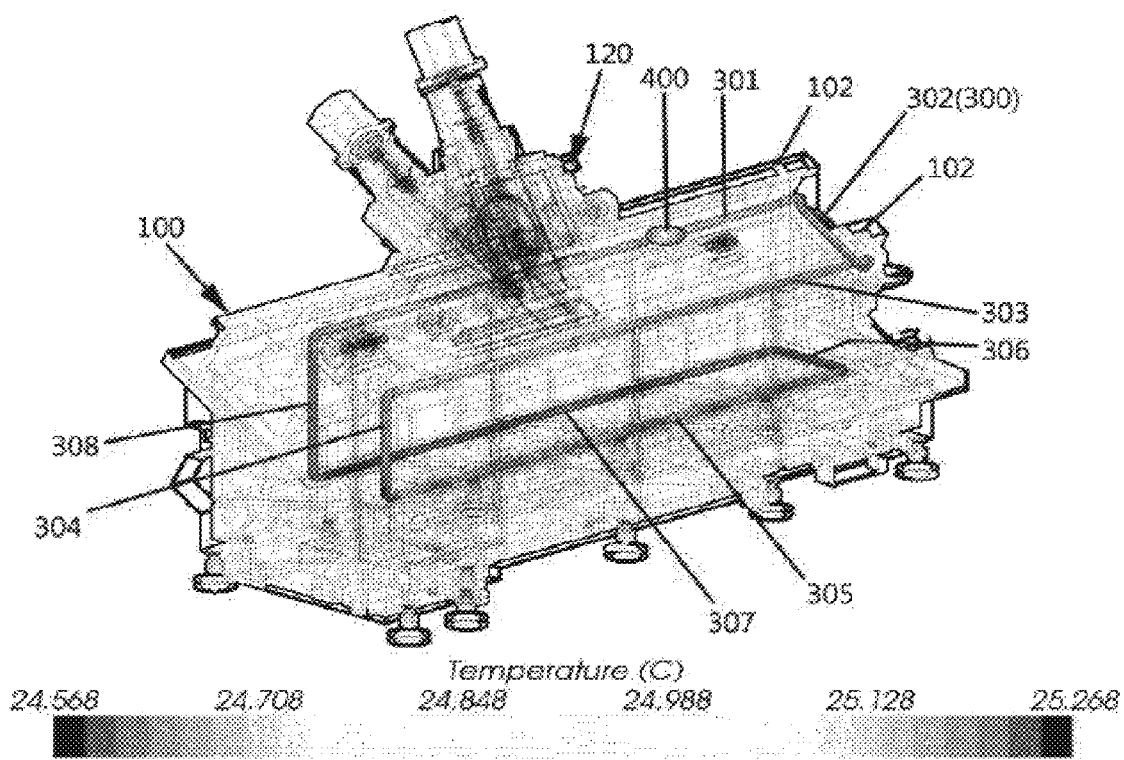
Figure 6:
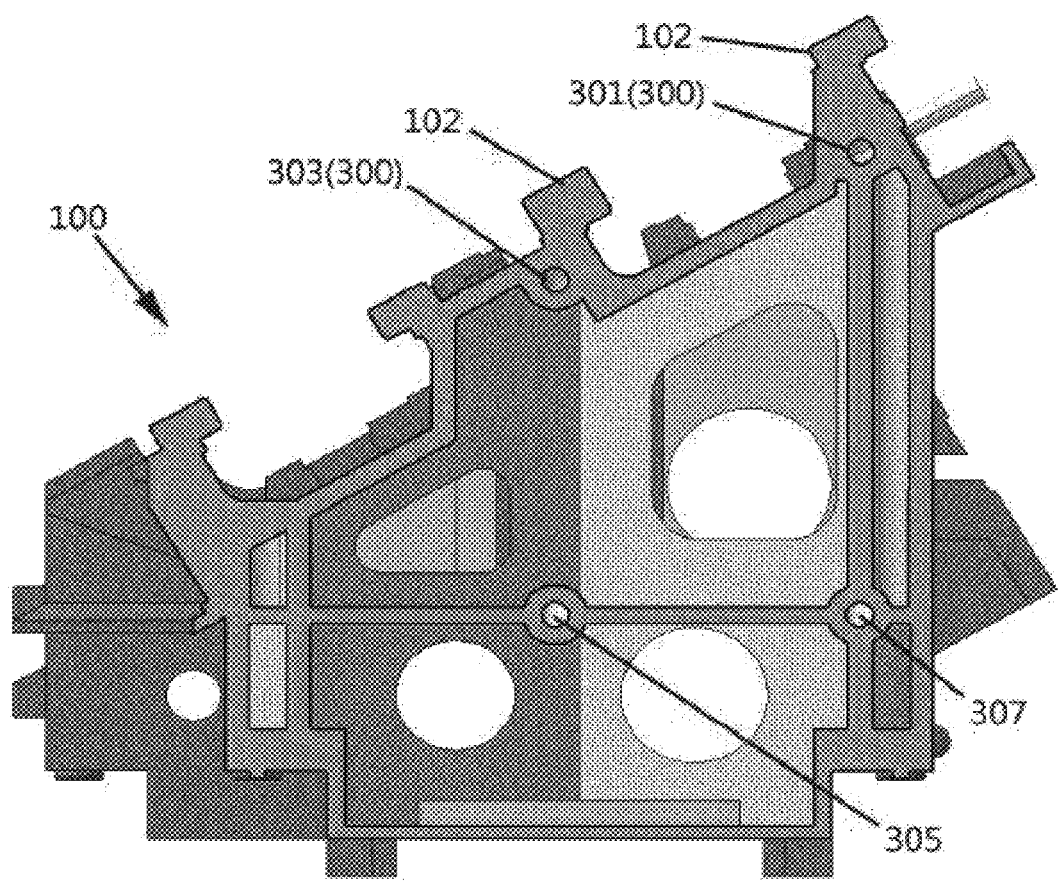
FIG. 6 is a view for explaining a cooling flow path formed in a structure in the structure for reducing thermal displacement of a machine tool structure according to the first and second exemplary embodiments of the present disclosure.
Figure 7:
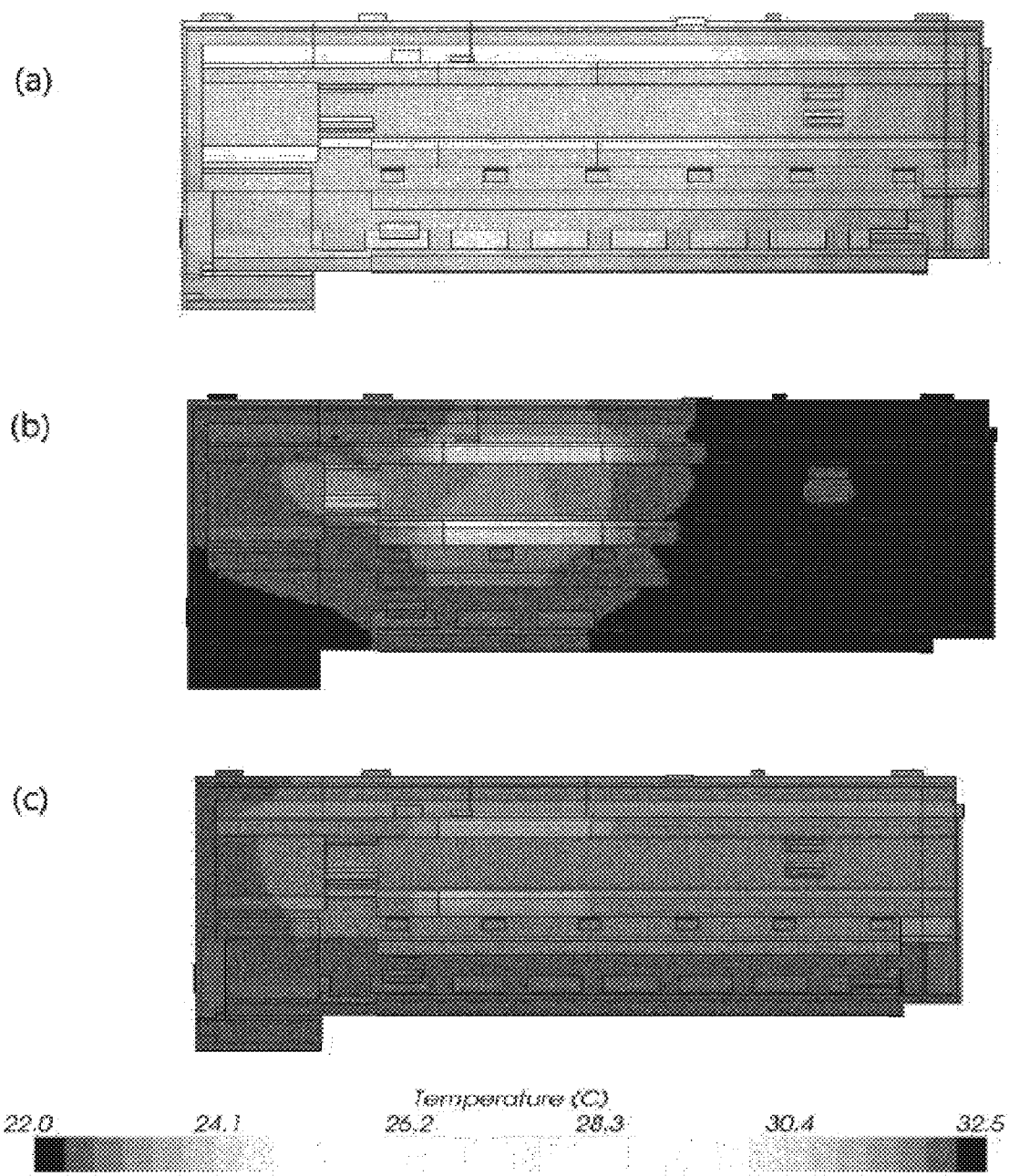
FIG. 7 is a view for comparing and explaining temperature distribution of the structure of the first comparative example and of a structure to which the structure for reducing thermal displacement of a machine tool structure according to the first and second exemplary embodiments of the present disclosure is applied.

The accompanying FIGS. 4 and 5 are views for explaining a structure for reducing thermal displacement of a machine tool structure according to the first and second exemplary embodiments of the present disclosure, FIG. 6 is a side view for explaining a cooling flow path formed in a structure in the structure for reducing thermal displacement of a machine tool structure according to the first and second exemplary embodiments of the present disclosure, and FIG. 7 is a view for comparing and explaining temperature distribution of the structure of the first comparative example and of a structure to which the structure for reducing thermal displacement of a machine tool structure according to the first and second exemplary embodiments of the present disclosure is applied.

First Exemplary Embodiment

In the structure for reducing thermal displacement of a machine tool structure according to the first exemplary embodiment of the present disclosure, the guide rail 102 is formed on the fixed structure 100, the movable structure 120 is installed on the guide rail 102, and a cooling unit 300 is disposed in the fixed structure 100.

The cooling unit 300 includes cooling flow paths (see 301 to 309) which circulate cooling oil.

In more detail, the cooling unit 300 may include first and second cooling units.

The first cooling unit is disposed in the fixed structure 100 to be adjacent to the guide rail 102, and performs a heat exchange between heat generated at the guide rail 102 and the cooling oil.

The second cooling unit is disposed below the first cooling unit to be spaced apart from the first cooling unit on the basis of the overall configuration of the fixed structure 100 and performs a heat exchange.

A pump unit 400 is disposed at one side of the cooling unit 300, and the pump unit 400 forcibly circulates the cooling oil along the first and second cooling units.

The cooling flow path has a configuration in which a plurality of holes is formed in a longitudinal direction of the fixed structure 100, pipes are disposed in the holes, and the plurality of pipes is filled with the cooling oil.

That is, first and third cooling flow paths 301 and 303 are formed to be parallel to a longitudinal direction of the guide rail 102 and adjacent to the guide rail 102, a fifth cooling flow path 305 is formed at a bottom side of the fixed structure 100, the first cooling flow path 301 and the third cooling flow path 303 are connected to a second cooling flow path 302, and the third cooling flow path 303 and the fifth cooling flow path 305 are connected to a fourth cooling flow path 304.

The first cooling unit may be the first and third cooling flow paths 301 and 303 which are disposed to be parallel to each other on the basis of the guide rail 102.

In addition, the second cooling unit may be fifth and seventh cooling flow paths 305 and 307 which are disposed below the first and third cooling flow paths 301 and 303 to be spaced apart from the first and third cooling flow paths 301 and 303.

Meanwhile, because the first and third cooling flow paths 301 and 303 and the fifth and seventh cooling flow paths 305 and 307 may be disposed in an internal space of the fixed structure 100 in the form of a '⊂', the fixed structure 100 may be configured to help uniformly distribute the cooling paths, and moreover, an effect of performing a heat exchange so as to allow temperature distribution of the fixed structure 100 to be uniform may be improved.

Meanwhile, the fifth cooling flow path 305 and the first cooling flow path 301 may be connected to a ninth cooling flow path 309, and the ninth cooling flow path 309 may be exposed outward from the fixed structure 100 so as to be connected.

A temperature of a specific part is raised by a heat source such as heat generated from the movable structure 120 at the guide rail 102, heat generated by pressure, or the like.

Here, when the pump unit 400 forcibly circulates the cooling oil, heat at a high-temperature part is moved to a low-temperature part such that a heat exchange is performed, and thereby, the entire heat distribution of the fixed structure 100 may become uniform.

Second Exemplary Embodiment

The structure for reducing thermal displacement of a machine tool structure according to the second exemplary embodiment of the present disclosure refers to a structure in which the structure of the cooling unit 300 of the first exemplary embodiment is changed.

As illustrated in FIG. 5, the cooling unit 300 includes cooling flow paths (see 301 to 308) which allows the cooling oil to be circulated by the pump unit 400.

In the cooling flow paths, the first and third cooling flow paths 301 and 303 are formed to be parallel to a longitudinal direction of the guide rail 102 and adjacent to the guide rail 102, the fifth and seventh cooling flow paths 305 and 307 are formed a bottom side of the fixed structure 100, the first cooling flow path 301 and the third cooling flow path 303 are connected to a second cooling flow path 302, and the third cooling flow path 303 and the fifth cooling flow path 305 are connected to a fourth cooling flow path 304.

Similarly, the fifth cooling flow path 305 and the seventh cooling flow path 307 are connected to a sixth cooling flow path 306, and the seventh cooling flow path 307 and the first cooling flow path 301 are connected to an eighth cooling flow path 308.

That is, the cooling flow paths of the second exemplary embodiment are circulated in the structure in a closed form.

Therefore, when a temperature is raised at a specific part of the guide rail 102 of the fixed structure 100, the pump unit 400 forcibly circulates the cooling oil, heat at a high-temperature part is moved to a low-temperature part such that a heat exchange is performed, and thereby, the entire heat distribution of the fixed structure 100 may become uniform.

The accompanying FIG. 6 is a side view for explaining the cooling flow paths of the second exemplary embodiment.

As illustrated in FIG. 6, in the cooling flow paths, the first and third cooling flow paths 301 and 303 are disposed at a position adjacent to the guide rail 102, and the fifth and seventh cooling flow paths 305 and 307 are disposed below the fixed structure 100.

Therefore, while high-temperature cooling oil is circulated, a heat exchange is performed at a lower side of the fixed structure 100 where a temperature is relatively low, and thereby, temperature distribution of the fixed structure 100 becomes uniform.

Hereinafter, an operation of the structure for reducing thermal displacement of a machine tool structure according to the first and second exemplary embodiments of the present disclosure will be described with reference to the accompanying FIG. 7.

FIG. 7(a) illustrates temperature distribution of the machine tool structure of the first comparative example in which the cooling unit 300 is not provided, FIG. 7(b) illustrates temperature distribution of the machine tool structure according to the first exemplary embodiment, and FIG. 7(c) illustrates temperature distribution of the machine tool structure according to the second exemplary embodiment.

As illustrated in FIG. 7, it can be seen that the overall temperature distribution of the machine tool structure becomes uniform by rapidly cooling a temperature that is locally raised in accordance with whether or not the cooling unit 300 is provided.

Hereby, in the structure for reducing thermal displacement of a machine tool structure according to the first and second exemplary embodiments of the present disclosure, it may be confirmed that local thermal deformation of the machine tool structure is prevented such that thermal displacement may be efficiently reduced, and moreover, deformation of the structure is reduced such that a relative high-precision processing may be implemented.

Third Exemplary Embodiment

A structure for reducing thermal displacement of a machine tool structure according to a third exemplary embodiment of the present disclosure refers to a structure in which the structure of the cooling unit 300 of the first exemplary embodiment is changed.

That is, the cooling unit 300 includes a plurality of loop cooling units (see 310 and 320) that allows the cooling oil to be circulated in a closed circuit, and the respective loop cooling units include pump units, respectively, and may forcibly circulate the cooling oil.

Figure 8:
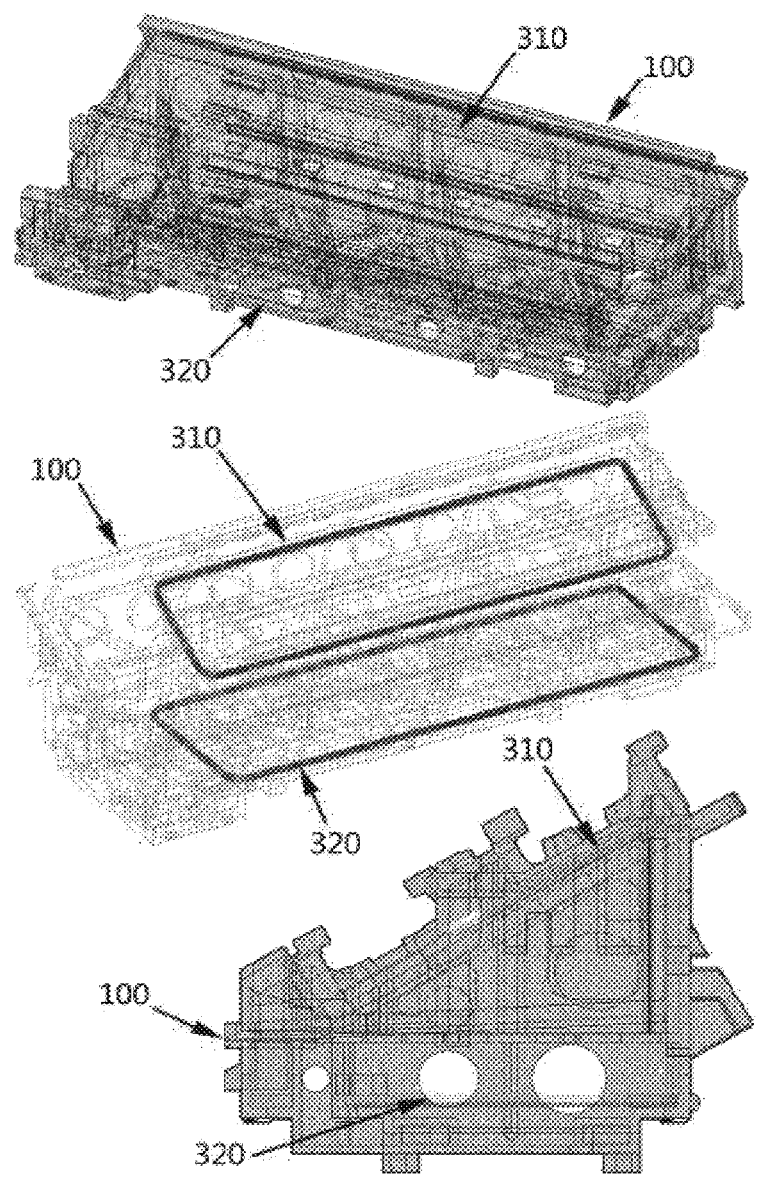

As illustrated in FIG. 8, in the third exemplary embodiment, the first loop cooling unit 310 is disposed at a side close to the guide rail of the fixed structure 100, and the second loop cooling unit 320 is disposed at a side farther on the basis of the guide rail than the first loop cooling unit 310.

Therefore, in the first and second loop cooling units 310 and 320 of the third exemplary embodiment, a distance of a path through which the cooling oil is circulated may be shorter in comparison with the first and second exemplary embodiments, and hereby, a heat exchange is more rapidly performed such that heat distribution may rapidly become uniform.

Fourth Exemplary Embodiment

A structure for reducing thermal displacement of a machine tool structure according to a fourth exemplary embodiment of the present disclosure refers to a structure in which the structure of the loop cooling unit of the third exemplary embodiment is changed.

Figure 9:
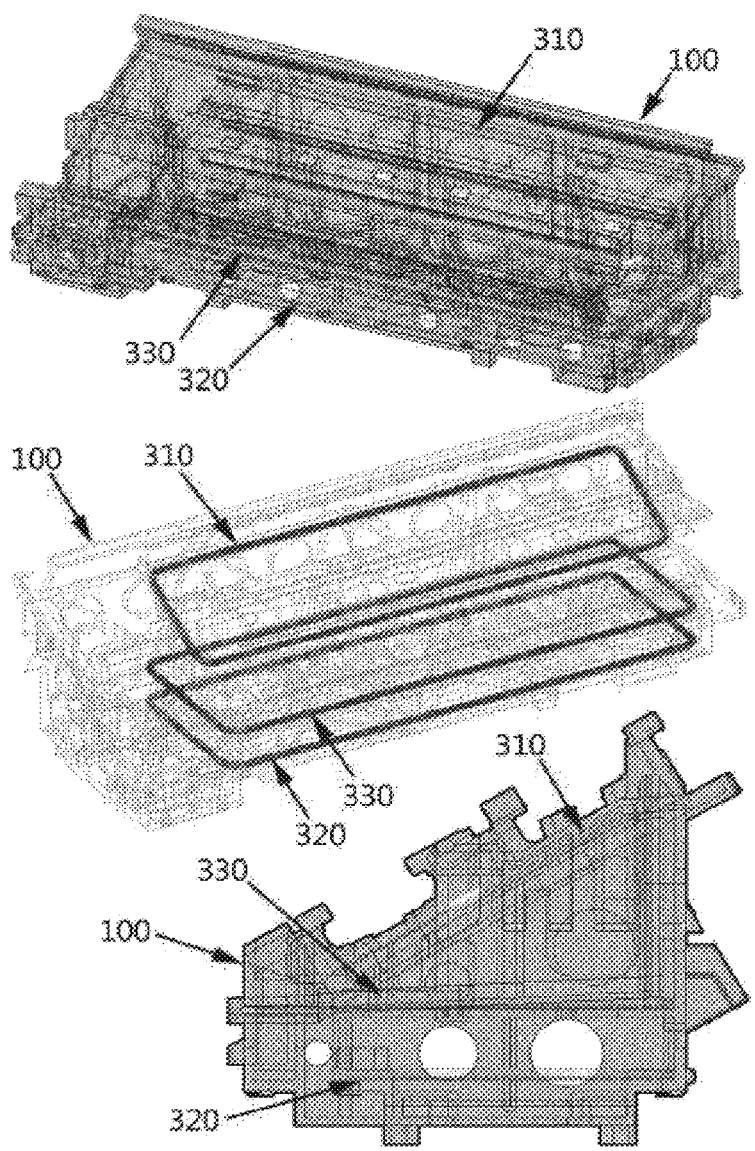

As illustrated in FIG. 9, the fourth exemplary embodiment is further provided with a third loop cooling unit 330 between the first loop cooling unit 310 and the second loop cooling unit 320.

Hereby, high-temperature heat generated at a specific part of the fixed structure 100 may be rapidly transferred to other parts, and particularly, heat is rapidly transferred to the entire fixed structure 100 by the plurality of first, second, and third loop cooling units 310, 320, and 330, and thereby heat distribution may rapidly become uniform.

Fifth Exemplary Embodiment

A structure for reducing thermal displacement of a machine tool structure according to a fifth exemplary embodiment of the present disclosure refers to a structure in which the structure of the loop cooling unit of the third exemplary embodiment is changed.

Figure 10:
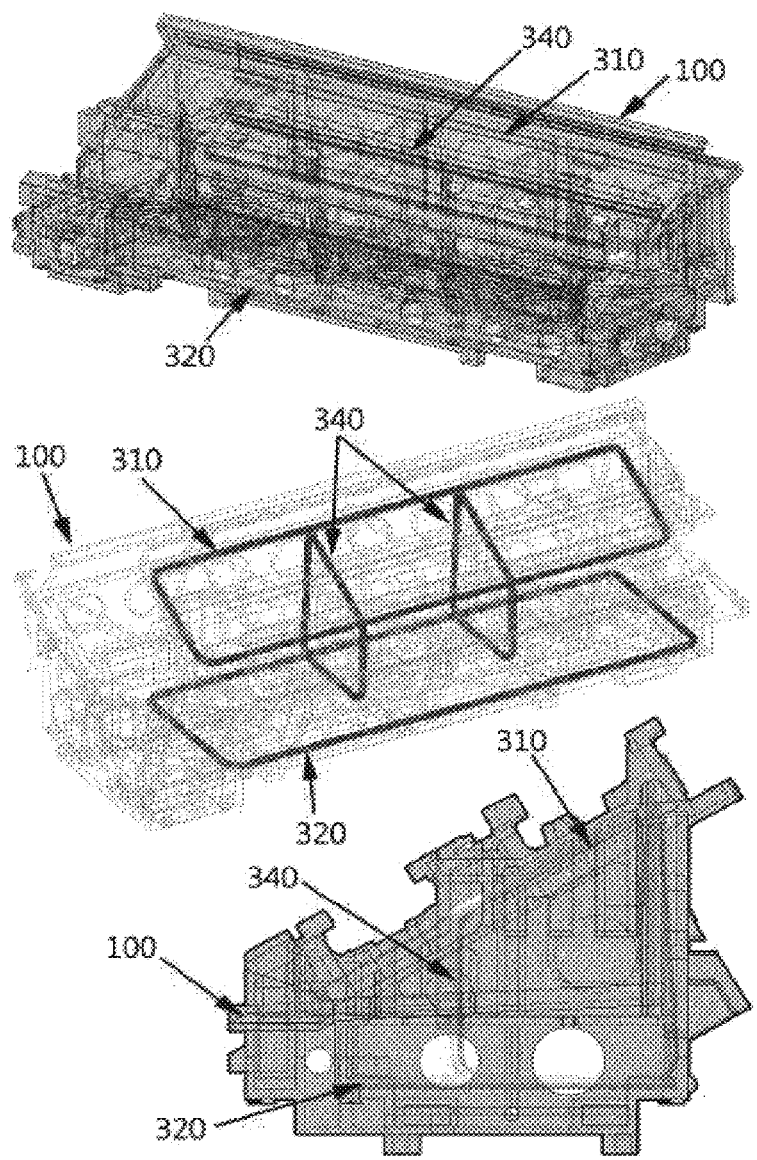

As illustrated in FIG. 10, the fifth exemplary embodiment is further provided with a connecting cooling flow path 340 so as to connect the first loop cooling unit 310 and the second loop cooling unit 320.

Hereby, the cooling oil in the first loop cooling unit 310 may be circulated to the second loop cooling unit 320, high-temperature heat generated at a specific part of the fixed structure 100 may be rapidly transferred to other parts, and particularly, the cooling oil is circulated in the first and second loop cooling units 310 and 320 through the connecting cooling flow path 340 such that heat is rapidly transferred to the entire fixed structure 100, and thereby heat distribution may rapidly become uniform.

Sixth Exemplary Embodiment

A structure for reducing thermal displacement of a machine tool structure according to a sixth exemplary embodiment of the present disclosure refers to a structure in which the structure of the loop cooling unit of the fourth exemplary embodiment is changed.

Figure 11:
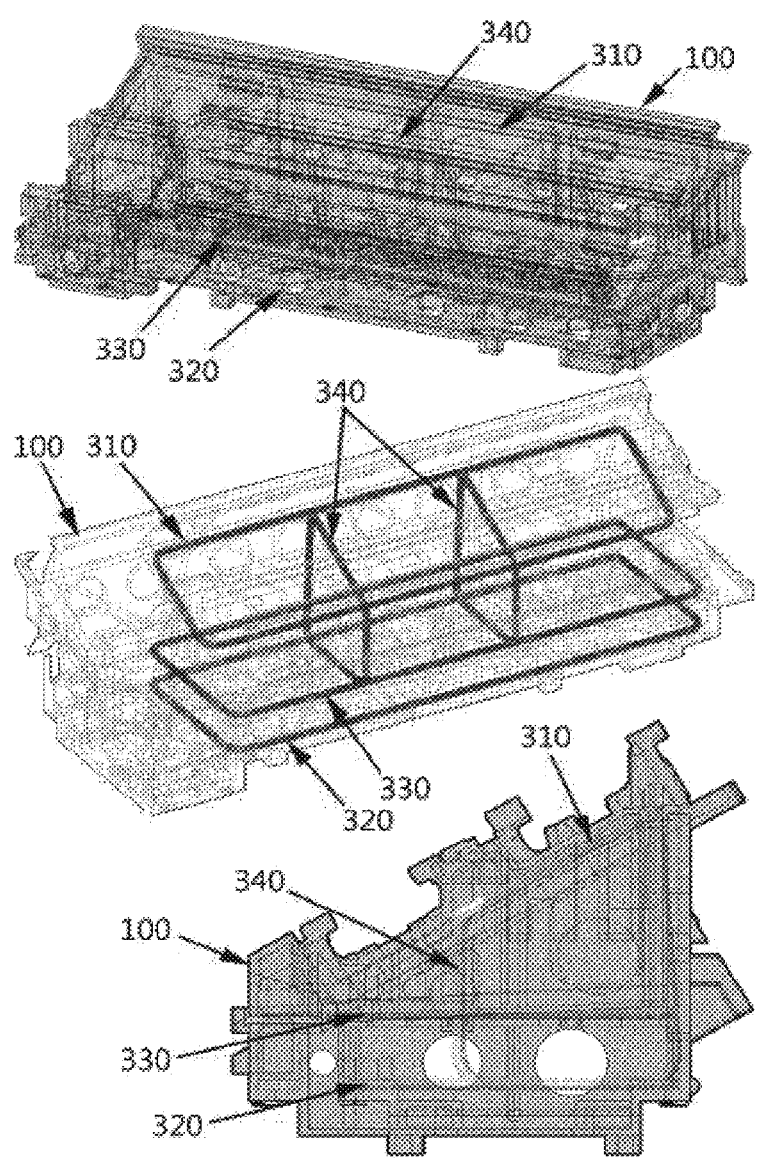

As illustrated in FIG. 11, the sixth exemplary embodiment is further provided with the connecting cooling flow path 340 so as to connect the first loop cooling unit 310, the second loop cooling unit 320, and the third loop cooling unit 330.

Hereby, the cooling oil in the first loop cooling unit 310 may be circulated to the second and third loop cooling units 320 and 330, high-temperature heat generated at a specific part of the fixed structure 100 may be rapidly transferred to other parts, and particularly, the cooling oil is circulated in the first, second, and third loop cooling units 310, 320, and 330 through the connecting cooling flow path 340 such that heat is rapidly transferred to the entire fixed structure 100, and thereby heat distribution may rapidly become uniform.

Seventh Exemplary Embodiment

A structure for reducing thermal displacement of a machine tool structure according to a seventh exemplary embodiment of the present disclosure refers to a structure in which the structure of the loop cooling unit of the third exemplary embodiment is changed.

Figure 12:
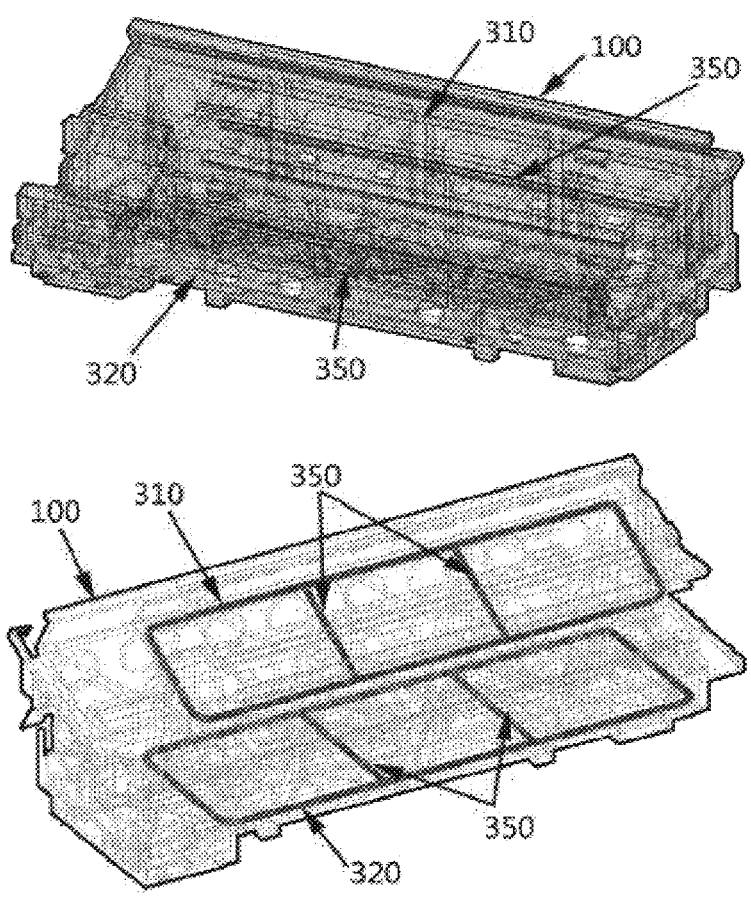

As illustrated in FIG. 12, the seventh exemplary embodiment is further provided with an auxiliary cooling flow path 350 in addition to the first and second loop cooling units 310 and 320.

The auxiliary cooling flow path 350 is provided so that when the cooling oil is circulated in the first and second loop cooling units 310 and 320, one part of the cooling oil is circulated along all of the paths of the first and second loop cooling units 310 and 320, and the other part thereof is circulated across the first and second loop cooling units 310 and 320.

Furthermore, the auxiliary cooling flow path 350 improves heat exchange efficiency by increasing an area for a heat exchange.

That is, in the seventh exemplary embodiment, the cooling oil may be more rapidly circulated, and hereby heat at a high-temperature part is rapidly transferred to a low-temperature part such that temperature distribution of the structure may become uniform.

Eighth Exemplary Embodiment

A structure for reducing thermal displacement of a machine tool structure according to an eighth exemplary embodiment of the present disclosure refers to a structure in which the structure of the loop cooling unit of the seventh exemplary embodiment is changed.

As illustrated in FIG. 13, the eighth exemplary embodiment is configured by putting auxiliary cooling flow paths 350 across each other in the form of an X in the first and second loop cooling units 310 and 320 such that the cooling oil may be rapidly circulated.

The auxiliary cooling flow path 350 is provided so that when the cooling oil is circulated in the first and second loop cooling units 310 and 320, one part of the cooling oil is circulated along all of the paths of the first and second loop cooling units 310 and 320, and the other part thereof is circulated across the first and second loop cooling units 310 and 320.

That is, in the eighth exemplary embodiment, the cooling oil may be more rapidly circulated, and hereby heat at a high-temperature part is rapidly transferred to a low-temperature part such that temperature distribution of the structure may become uniform.

Ninth Exemplary Embodiment

A structure for reducing thermal displacement of a machine tool structure according to a ninth exemplary embodiment of the present disclosure refers to a structure in which the structure of the loop cooling unit of the eighth exemplary embodiment is changed.

Figure 14:
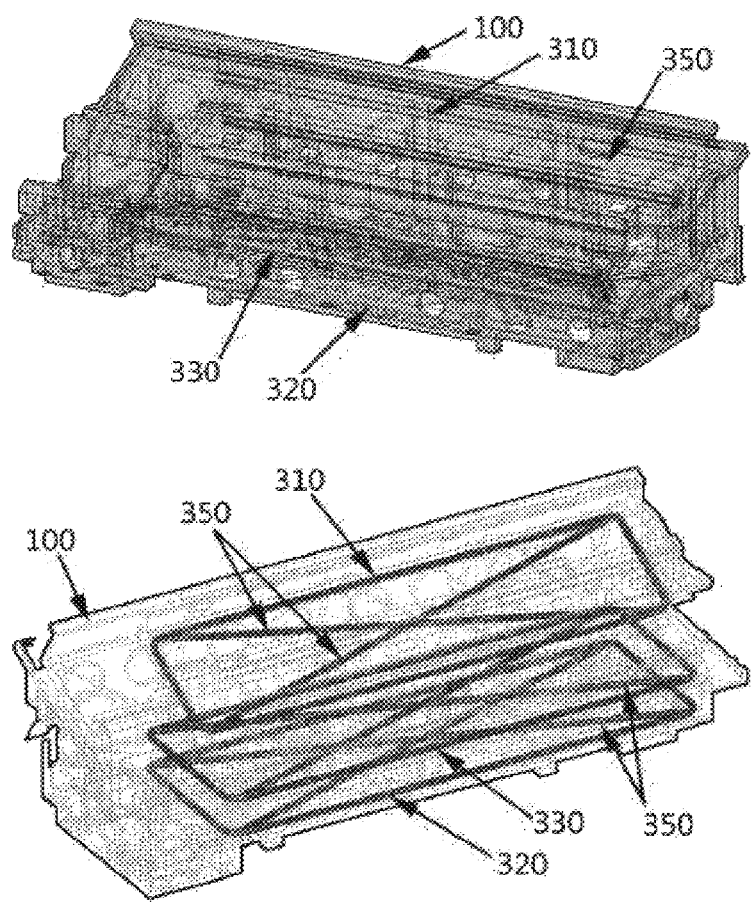

As illustrated in FIG. 14, the ninth exemplary embodiment is further provided with the third loop cooling unit 330 in addition to the first and second loop cooling units 310 and 320, and includes the auxiliary cooling flow paths 350, which is put across each other in the form of an X, at the respective first, second, and third loop cooling units 310, 320, and 330 such that the cooling oil may be rapidly circulated in the respective loop cooling units.

The auxiliary cooling flow path 350 is provided so that when the cooling oil is circulated in the first, second, and third loop cooling units 310, 320, and 330, one part of the cooling oil is circulated along all of the paths of the first, second, and third loop cooling units 310, 320, and 330, and the other part thereof is circulated across the first, second, and third loop cooling units 310, 320, and 330.

That is, in the ninth exemplary embodiment, the cooling oil may be more rapidly circulated, and hereby heat at a high-temperature part is rapidly transferred to a low-temperature part such that temperature distribution of the structure may become uniform.

Second Comparative Example

Figure 15:
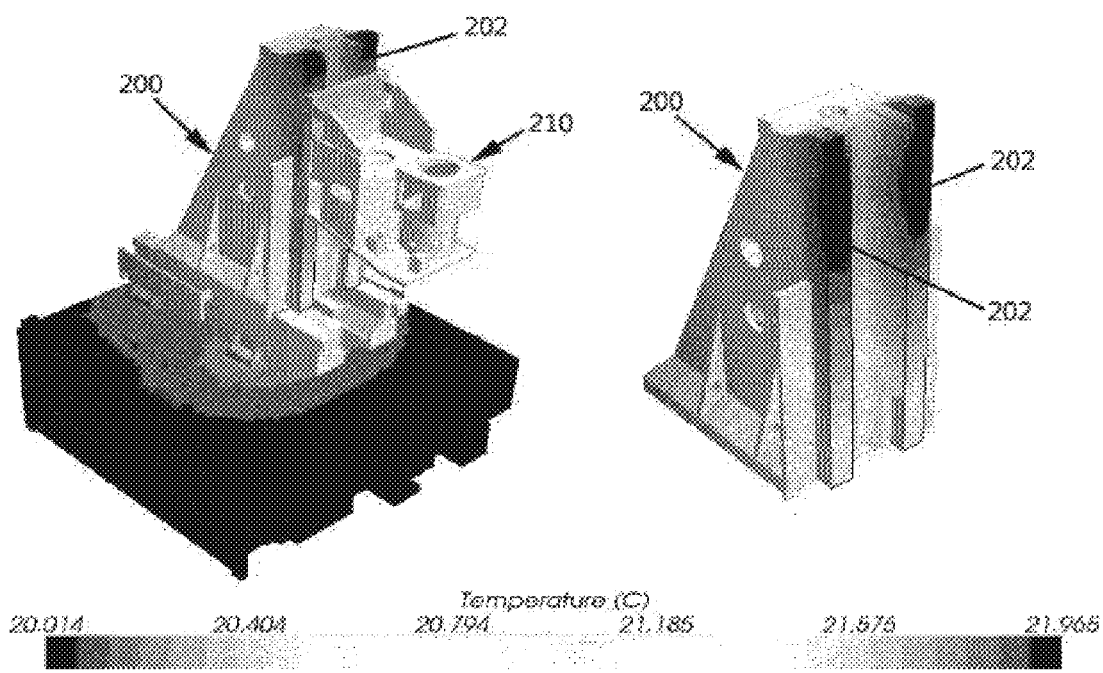
FIG. 15 is a view for explaining a structure that is a second comparative example of the machine tool.
Figure 16:
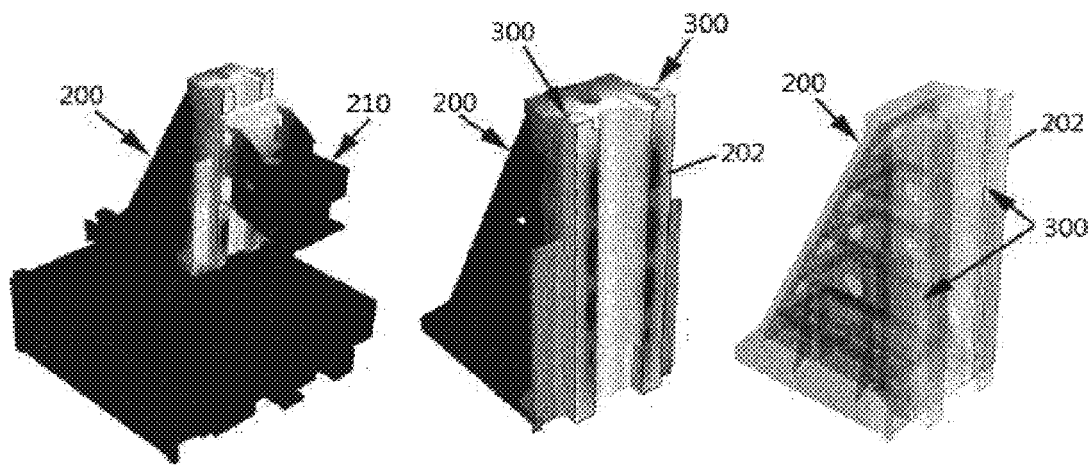
FIGS. 16 and 17 are views for explaining a structure for reducing thermal displacement of a machine tool structure according to tenth and eleventh exemplary embodiments of the present disclosure.
Figure 17:
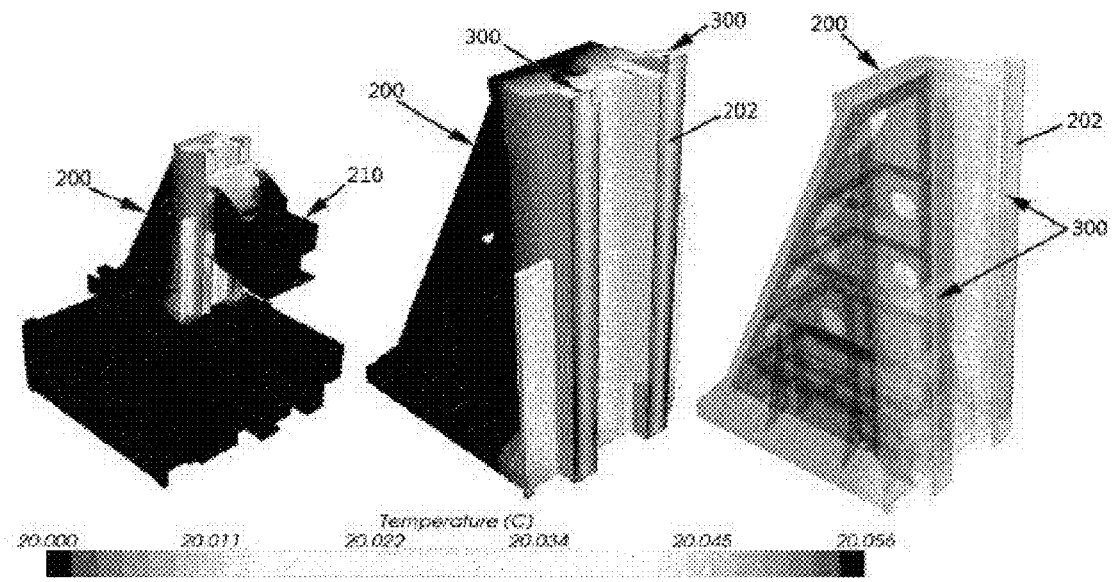

The accompanying FIG. 15 is a view for explaining a structure that is a second comparative example of the machine tool.

As illustrated in FIG. 15, a structure may be disposed in a vertical direction or in an inclined direction in accordance with a disposition form thereof.

In more detail, the guide rail 202 may be formed on one side of the fixed structure 200 in a vertical direction or in an inclined direction, and the movable structure 210 is installed on the guide rail 202 so as to be moved by a transfer system unit.

In the machine tool, heat is generated due to various reasons such as heat generation at various motors, heat generation at bearings, heat generation at ball screws, heat generation at gear boxes, heat generation in a process of cutting work pieces, heat generation at hydraulic units, or the like, and the generated heat is transferred to the structure.

The generated heat causes a problem of thermal deformation in which the structure is distorted by locally raising a temperature at a specific part of the structure.

Particularly, in the structure, a phenomenon occurs in which a temperature at the guide rail 202 is locally raised, compressive stress and tensile stress may be simultaneously applied to the guide rail 202 when the fixed structure 200 and the movable structure 210 perform motion together with each other, and heat may be generated due to friction when the movable structure 210 is moved.

That is, as illustrated in FIG. 15, in the second comparative example, a large amount of temperature deviation occurs at the guide rail 202 part and a rear part of the fixed structure 200, and this temperature deviation causes a problem of increasing thermal displacement of the structure.

Tenth Exemplary Embodiment

In a structure for reducing thermal displacement of a machine tool structure according to a tenth exemplary embodiment of the present disclosure, the cooling unit 300 is disposed on the guide rail 202 of the fixed structure 200.

In more detail, the cooling unit 300 allows the cooling oil to be circulated in the fixed structure 200.

When a simulation is performed using a thermal flow analysis software, it can be seen that a temperature is relatively lowered in comparison with the second comparative example, and it can be seen that temperature distribution becomes uniform with respect to the entire guide rail 202.

That is, as temperatures of the guide rail 202 become uniform, thermal displacement is reduced, and thereby a high-precision processing may be implemented.

Eleventh Exemplary Embodiment

A structure for reducing thermal displacement of a machine tool structure according to an eleventh exemplary embodiment of the present disclosure is implemented by changing the disposition of the cooling unit 300 of the tenth exemplary embodiment.

In more detail, high-temperature heat is rapidly transferred to other parts of the structure by disposing the cooling unit 300 on the guide rail 202 that becomes a heat source.

When a simulation is performed using the thermal flow analysis software, it can be seen that temperature distribution becomes more uniform with respect to the entire guide rail 202 in comparison with the tenth exemplary embodiment.

That is, as temperatures of the guide rail 202 become uniform, thermal displacement is further reduced, and thereby a high-precision processing may be implemented.

Third Comparative Example

Figure 18:
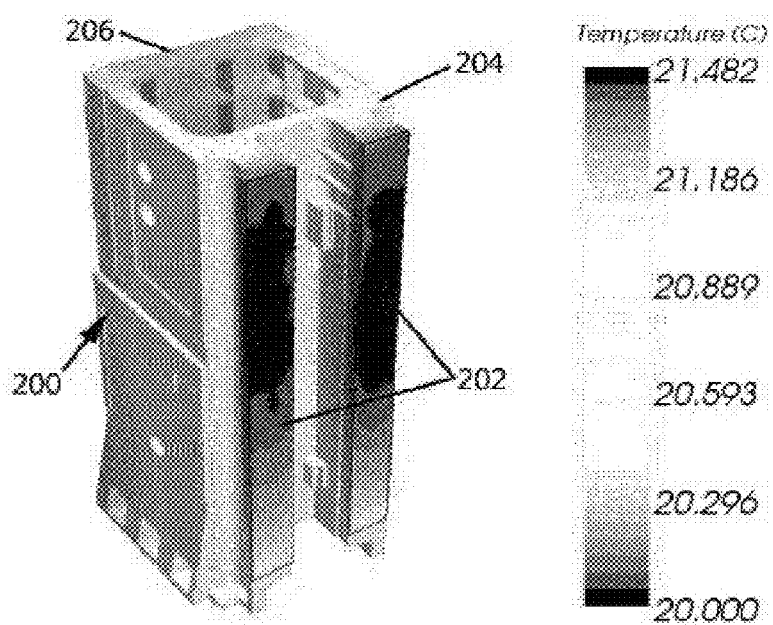
FIG. 18 is a view for explaining a structure that is a third comparative example of the machine tool.

FIG. 18 is a view for explaining a structure that is a third comparative example of the machine tool.

The structure (fixed structure, see 200) of the third comparative example refers to a structure in a hollow form of which inside is vacant, and has a form having one side on which the guide rail 202 is formed.

When the fixed structure 200 is described in more detail, the guide rail 202 is provided in the form of protrusion, and on the basis of the guide rail 202, the fixed structure 200 may be separated into a first part 204, which is close to the guide rail 202, and a second part 206, which is far from the guide rail 202.

When a simulation is performed using the thermal flow analysis software, it can be seen that a temperature difference greatly occurs between the guide rail 202 (source where heat is generated) and a rear side (the second part 206) of the fixed structure 200.

In the fixed structure 200, a maximum temperature at a specific part was 21.482° C., and a maximum temperature deviation was indicated as 1.332° C.

That is, this temperature deviation causes a problem of increasing thermal displacement of the fixed structure 200.

Twelfth Exemplary Embodiment

Figure 19:
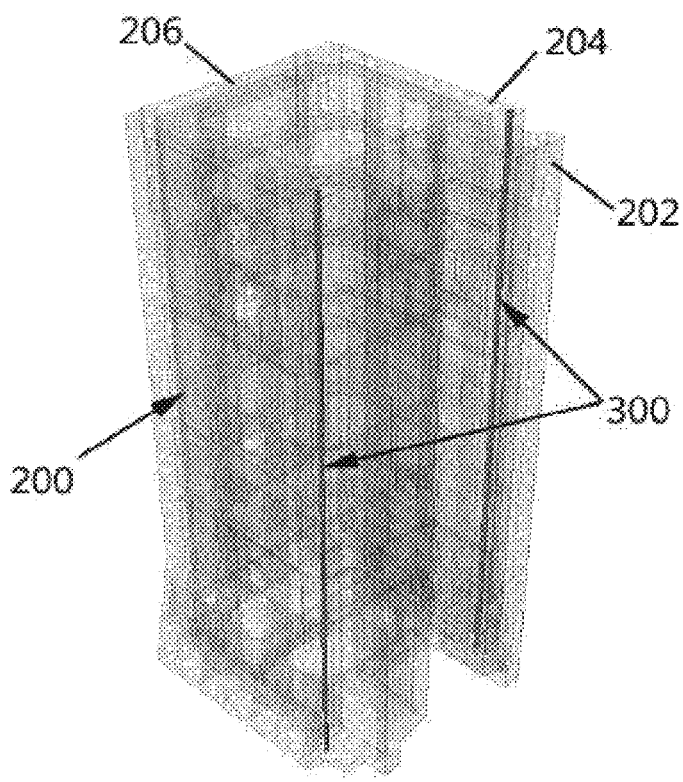
FIGS. 19 and 20 are views for explaining a structure for reducing thermal displacement of a machine tool structure according to a twelfth exemplary embodiment of the present disclosure.
Figure 20:
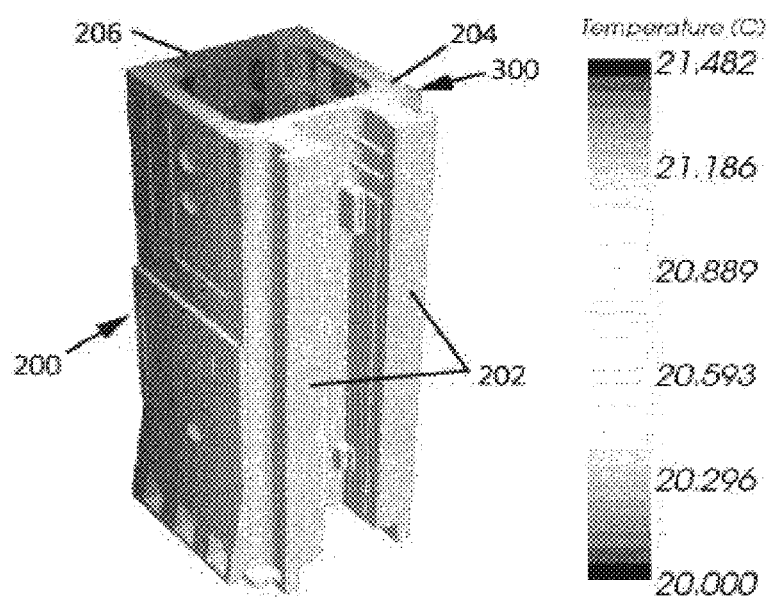

The accompanying FIGS. 19 and 20 are views for explaining a structure for reducing thermal displacement of a machine tool structure according to a twelfth exemplary embodiment of the present disclosure.

The twelfth exemplary embodiment is provided with the cooling unit 300 in addition to the structure of the third comparative example.

In more detail, the cooling unit 300 is configured so that the cooling oil may be circulated therein.

When seeing the entire shape of the fixed structure 200, the cooling unit 300 is disposed at the first part 204 that is a position close to the guide rail 202.

When a simulation of the twelfth exemplary embodiment is performed using the thermal flow analysis software, there was an overall cooling effect, a maximum temperature was 21.025° C., and a maximum deviation was indicated as 0.946° C.

That is, it can be seen that the twelfth exemplary embodiment may reduce a temperature deviation in comparison with the third comparative example, and thereby thermal displacement of the fixed structure 200 may be reduced.

Thirteenth Exemplary Embodiment

Figure 21:
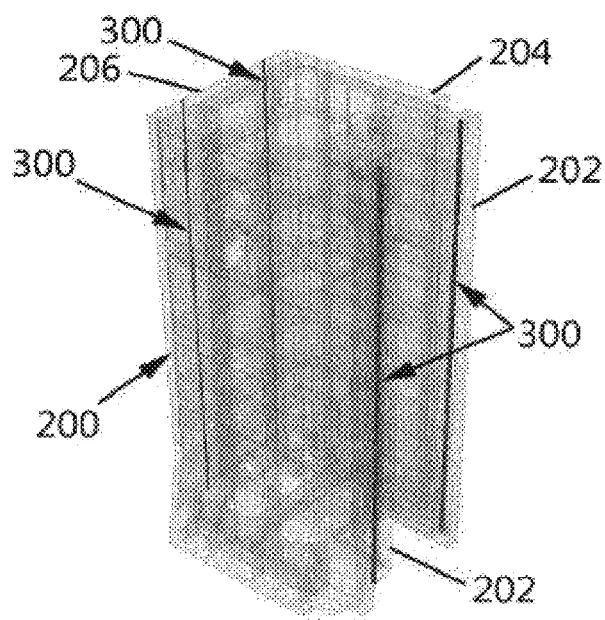
FIGS. 21 and 22 are views for explaining a structure for reducing thermal displacement of a machine tool structure according to a thirteenth exemplary embodiment of the present disclosure.
Figure 22:
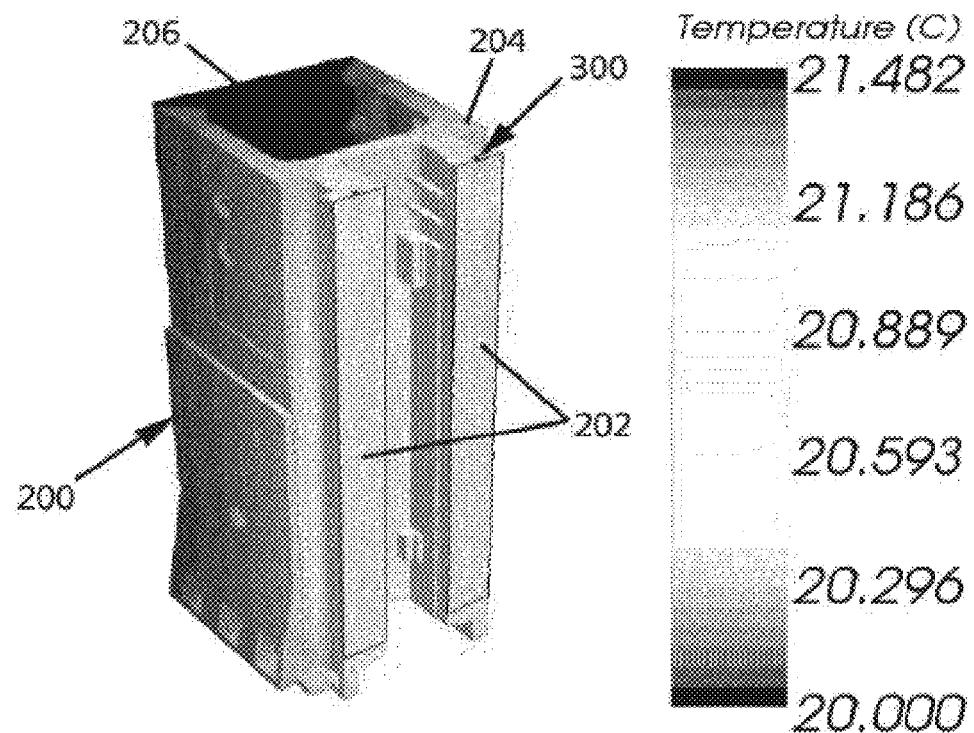

FIGS. 21 and 22 are views for explaining a structure for reducing thermal displacement of a machine tool structure according to a thirteenth exemplary embodiment of the present disclosure.

The thirteenth exemplary embodiment is provided with the cooling unit 300 in addition to the structure of the third comparative example so that the cooling oil may be circulated.

In more detail, with respect to a position at which the cooling unit 300 is disposed, when seeing the entire shape of the fixed structure 200, the cooling unit 300 is disposed at the guide rail 202 and at the second part 206 which is far from the guide rail 202.

When a simulation of the thirteenth exemplary embodiment is performed using the thermal flow analysis software, there was an overall cooling effect, a maximum temperature was 20.589° C., and a maximum deviation was indicated as 0.567° C.

That is, it can be seen that the thirteenth exemplary embodiment may further reduce a temperature deviation in comparison with the twelfth exemplary embodiment, and thereby thermal displacement of the fixed structure 200 may be further reduced.

Fourteenth Exemplary Embodiment

Figure 23:
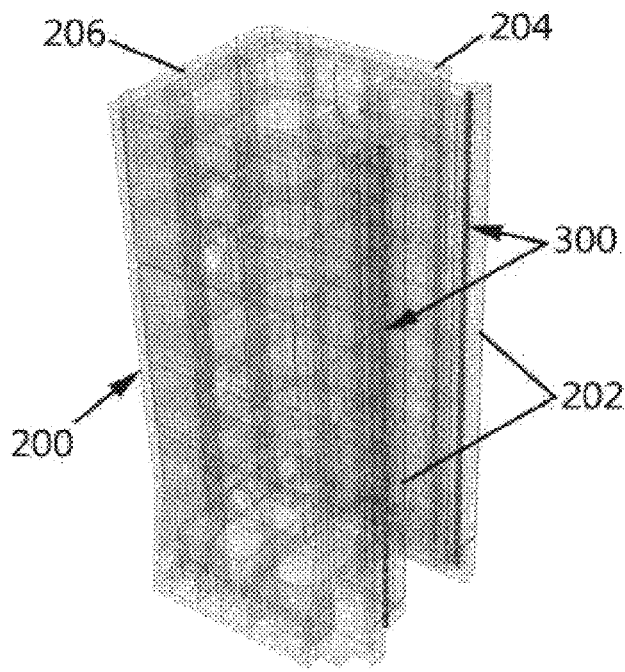
FIGS. 23 and 24 are views for explaining a structure for reducing thermal displacement of a machine tool structure according to a fourteenth exemplary embodiment of the present disclosure.
Figure 24:
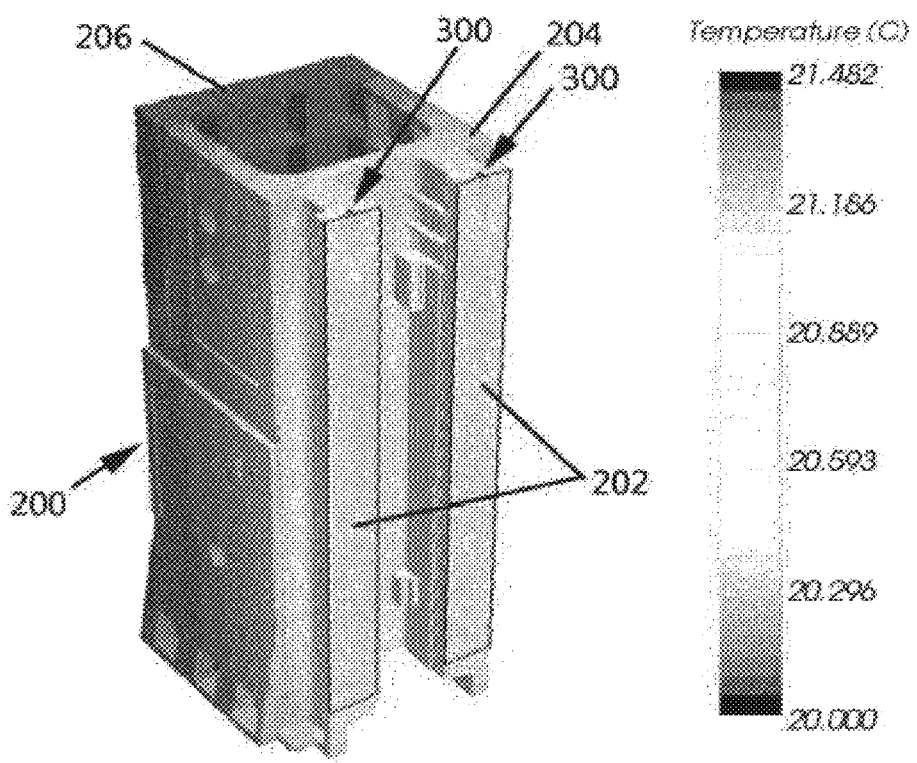

FIGS. 23 and 24 are views for explaining a structure for reducing thermal displacement of a machine tool structure according to a fourteenth exemplary embodiment of the present disclosure.

The fourteenth exemplary embodiment is provided with the cooling unit 300 in addition to the structure of the third comparative example so that the cooling oil may be circulated.

In more detail, with respect to a position at which the cooling unit 300 is disposed, when seeing the entire shape of the fixed structure 200, the cooling unit 300 is disposed at the guide rail 202.

When a simulation of the fourteenth exemplary embodiment is performed using the thermal flow analysis software, there was an overall cooling effect, a maximum temperature was 20.589° C., and a maximum deviation was indicated as 0.533° C.

That is, it can be seen that the fourteenth exemplary embodiment may further reduce a temperature deviation in comparison with the thirteenth exemplary embodiment, and thereby thermal displacement of the fixed structure 200 may be further reduced.

As described above, the structure for reducing thermal displacement of a machine tool structure according to the exemplary embodiments of the present disclosure may allow the overall temperature distribution of the structure to become uniform by rapidly transferring high-temperature heat of a heat source to a part of which a temperature is relatively low, and thereby the structure may reduce thermal displacement with respect to thermal stress.

In addition, the structure for reducing thermal displacement of a machine tool structure according to the exemplary embodiments of the present disclosure may implement ultra-high-precision processing by reducing thermal displacement.

On the other hand, a system for reducing thermal displacement of a machine tool structure according to the exemplary embodiments of the present disclosure is used at a temperature greatly lower than an evaporation temperature of the cooling oil even when heat is generated such that evaporation or loss of the cooling oil barely occurs, and therefore the cooling oil may be used semipermanently.

In addition, in the system for reducing thermal displacement of a machine tool structure according to the exemplary embodiments of the present disclosure, external impurities do not flow into the cooling oil, and the coolant oil may perform an action of a coolant for a heat exchange because debris does not affect the circulation even though minute debris flows into the cooling oil, and thereby a filtering device like the related art may not be provided.

In addition, since the system for reducing thermal displacement of a machine tool structure according to the exemplary embodiments of the present disclosure simply circulates the cooling oil when circulating the cooling oil, the pump unit 400 may not be compulsorily driven, and thereby a lifespan of the pump unit 400 is not extremely shortened.

That is, in the system for reducing thermal displacement of a machine tool structure according to the exemplary embodiments of the present disclosure, a large number of subordinate equipment like the related art is not required such that there is an effect of reducing costs, and separate costs and labor are not required to perform maintenance.

While the exemplary embodiments of the present disclosure have been described with reference to the accompanying drawings, those skilled in the art will appreciate that the present disclosure can be implemented in other detailed embodiments, without departing from the technical spirit and essential features of the disclosure.

Therefore, it should be understood that the above-described exemplary embodiments are only illustrative in all aspects, not restrictive. The scope of the present disclosure should be defined by the accompanying claims rather than the detailed description. Various modifications, additions, and substitutions derived from the meaning and scope of the accompanying claims and equivalent concept thereof should be interpreted as being included in the scope of the present disclosure.

The structure for reducing thermal displacement of a machine tool structure according to the present disclosure may be used to implement a high-precision processing by rapidly transferring heat to other parts when a temperature is raised at a specific part of the structure of the machine tool, and by allowing the overall temperature distribution of the structure to become uniform so as to reduce thermal displacement of the structure.

Although the present disclosure has been described with reference to exemplary and preferred embodiments, workers skilled in the art will recognize that changes may be made in form and detail without departing from the spirit and scope of the disclosure.

The invention claimed is:

1. A structure for reducing thermal displacement of a machine tool structure, comprising:
a transfer table which is provided in the machine tool structure and has one side on which a guide rail is formed;
a turret unit which is configured to be installed on the guide rail and move; and
a cooling unit which allows cooling oil to be circulated in the transfer table so as to cool the transfer table, and allows temperature distribution of the transfer table to be uniform,
wherein the cooling unit includes:
a first cooling unit in which first and third cooling flow paths are disposed to be parallel to each other on the basis of the guide rail in the transfer table to be adjacent to the guide rail, and the first cooling flow path and the third cooling flow path are connected to a second cooling flow path so that a heat exchange is performed between heat generated at the guide rail and the cooling oil;
a second cooling unit in which fifth and seventh cooling flow paths are disposed below the first and third cooling flow paths to be spaced apart from the first and third cooling flow paths on the basis of the overall configuration of the transfer table, and the fifth cooling flow path and the seventh cooling flow path are connected to a sixth cooling flow path so that a heat exchange is performed between the cooling oil and the transfer table;
fourth and eighth cooling flow paths which connect the first and third cooling flow paths and the fifth and seventh cooling flow paths, respectively; and
a pump unit which is disposed at one side of the cooling unit in the transfer table, and is configured to forcibly circulate the cooling oil along the first, second, third, fourth, fifth, sixth, seventh, and eighth cooling flow paths so as to allow temperature distribution of the transfer table to be uniform,
wherein the first, second, third, fourth, fifth, sixth, seventh, and eighth cooling flow paths are completely disposed in the transfer table in the form of a loop.

2. A structure for reducing thermal displacement of a machine tool structure, comprising:
a transfer table which is provided in the machine tool structure, and has one side on which a guide rail is formed;
a turret unit which is configured to be installed on the guide rail of the transfer table, and move; and
a cooling unit having multiple cooling flow paths in the form of a closed loop, with the close loop being completely disposed in the transfer table, to be adjacent to the guide rail on the basis of the overall configuration of the transfer table, and allows temperature distribution of the transfer table to be uniform by performing a heat exchange between heat generated at the guide rail and cooling oil so as to cool the transfer table.

3. The structure of claim 2, wherein a cooling flow path of the cooling unit is disposed to pass through the guide rail.

4. A structure for reducing thermal displacement of a machine tool structure, comprising:
a transfer table which is provided in the machine tool structure, and has one side on which a guide rail is formed;
a turret unit which is configured to be installed on the guide rail of the transfer table, and move;
a first cooling flow path which is disposed at the transfer table to be adjacent to the guide rail on the basis of the overall configuration of the transfer table, and formed in the transfer table;
a fifth cooling flow path which is formed at a position spaced apart from the first cooling flow path in the transfer table; and
a pump unit which circulates higher-temperature cooling oil in the first cooling flow path and lower-temperature cooling oil in the fifth cooling flow path in a closed form so as to allow temperature distribution of the transfer table to be uniform,
wherein the first and fifth cooling flow paths are in the form of a closed loop completely disposed in the transfer table.

* * * * *